United States Patent [19]
Indermaur et al.

[11] Patent Number: 5,953,237
[45] Date of Patent: *Sep. 14, 1999

[54] POWER BALANCING TO REDUCE STEP LOAD

[75] Inventors: Thomas N. Indermaur; Matthew L. Biggio, both of Fort Collins; William Weiner, Llama Lane Windsor, all of Colo.

[73] Assignee: Hewlett-Packard Company, Palo Alto, Calif.

[ * ] Notice: This patent is subject to a terminal disclaimer.

[21] Appl. No.: 08/753,453

[22] Filed: Nov. 25, 1996

[51] Int. Cl.⁶ ........................................................ G06F 1/18
[52] U.S. Cl. ............................. 364/528.3; 364/528.32; 364/707; 702/60; 702/186; 395/750.01; 395/750.03; 395/750.06

[58] Field of Search ................................. 364/493, 707, 364/273, 273.1, 273.2, 273.3, 492, 528.21, 582.3, 948.4, 948.7, 948.8, 948.9, 528.26, 528.28, 528.32; 395/750.01, 750.02, 750.03, 750.04, 750.05, 750.06, 750.07, 750.08, 182.12, 182.2, 182.19, 182.21, 183.13; 365/226, 227; 702/60, 61, 182, 183, 186

[56] References Cited

U.S. PATENT DOCUMENTS

| | | | |
|---|---|---|---|
| 5,452,401 | 9/1995 | Lin | 395/750 |
| 5,666,537 | 9/1997 | Debnath et al. | 395/750.04 |
| 5,740,087 | 4/1998 | Smentek et al. | 364/707 |

*Primary Examiner*—Hal Dodge Wachsman

[57] ABSTRACT

A method and structure of power balancing is capable of simultaneously minimizing maximum power while also reducing the step load of any electronic system, subsystem, or device having one or more functional units or resources that are not in constant use and that are therefore capable of being selectively powered-down or powered-up.

21 Claims, 3 Drawing Sheets

POWER BALANCING TO REDUCE STEP LOAD

FIELD OF THE INVENTION

This invention relates generally to the power dissipation characteristics of electronic systems, sub-systems, or devices, and more particularly to the power dissipation characteristics of electronics systems, sub-systems, or devices having one or more functional units or resources that are capable of being selectively powered-down or powered-up.

BACKGROUND OF THE INVENTION

The power consumption associated with any complex electronic system or device, such as a VLSI (Very Large Scale Integration) system, a computer system, or a processor, can be quite large and costly. The large power consumption of high-performance computer systems, for instance, make the design of power distribution and cooling sub-systems very challenging and often very costly. A processor of such a high-performance computer system typically will dissipate a large component of the total power of the computer system and therefore the power dissipation characteristics of the processor are customarily optimized in order to reduce the overall cost of the computer system. Optimizing the power characteristics of the processor in order to minimize power dissipation focuses on the goal of reducing maximum power, reducing average power and reducing step load of the computer system. The relative advantages and disadvantages of these design goals will now be explored in turn.

Reducing Maximum Power

Reducing the maximum power provides several benefits to the cooling sub-system and the power distribution sub-system of an electronic system or device. In terms of the cooling sub-system of a computer system, for example, when a processor of the computer system dissipates maximum power it also generates maximum heat. In order to prevent overheating of the computer system, the cooling sub-system must, ideally, remove heat as quickly as it is generated. High-power processors often require quite aggressive and expensive cooling solutions to adequately remove generated heat.

With respect to the power distribution sub-system of an electronic system, the power supply of the system must deliver the maximum current demanded by the system. In a computer system in which the processor requires a large portion of available system power, maximum power of the processor can be expected to significantly increase the power rating required of the system power supply. Power supplies possessing the requisite power rating for a computer system are expensive, which again causes overall system cost to increase. Additionally, a high-power component of the system, such as a processor, may increase the power requirements of the system such that a single standard power cord is no longer capable of supplying the required power. A room in which an electronic system or device having special power requirements is to be used may have to be rewired to accommodate non-standard power supplies, for instance.

In addition to increasing system cost, the maximum power of an electronic system or device, such as the processor of a computer system, may also have an adverse impact on system performance. The power dissipated by a processor, for instance, is translated into heat that slows down the operation of the processor as well as other system components. Therefore, reducing the maximum power of the processor reduces heat generation. Reduced heat generation translates into higher processor operating frequencies that will in turn increase overall system performance. CMOS (complementary metal oxide semiconductor) circuits, in particular, are often used in processors and are known to operate faster at lower temperatures.

Multi-processor systems present special power concerns. In multi-processor systems, performance is a function of the number of processors used in parallel in a particular multi-processor system. Because each new processor added to the system increases the total maximum power of the system, the number of processors of the multi-processor system present obvious power supply and cooling considerations. Reducing the maximum power of each processor of the multi-processor system reduces the total maximum power and heat generated by the system. Or, more processors can be used without increasing total maximum power and heat of the system which in turn increases the speed and performance of the system.

Reducing Average Power

Reducing the average power of a device or sub-system of an electronic system means that less power is dissipated over a given period of time. Reducing the average power of a processor, for instance, will reduce the total energy consumed over time by the computer system containing that processor. The ability to reduce average power is especially desirable in portable computers that are capable of running off battery power. In a portable computer, reducing average power enables the portable computer to have a longer battery life for a given battery size, or it allows a less expensive battery to be used to achieve an equivalent battery life.

For non-portable computer systems that do not operate off battery power, reducing the average power of the system provides the advantage of lowering the cost of powering the computer system over time. Thus, reducing the average power of a processor of the non-portable computer system will reduce the cost of providing power to the system over time. While this is a desirable advantage in so far as utility costs will be reduced, such a cost savings is not usually a key factor in the decision of whether to purchase a non-portable computer system, particularly for high-end non-portable computer systems.

Reducing Step Load

For a system to operate correctly, the power supply must be capable of maintaining voltage levels within a tight tolerance. If power consumption of the system varies widely over a short period of time, this greatly complicates power distribution which in turn increases the total cost of the system. Variation of power consumption, called step load, is the difference between maximum and minimum power consumption of the system.

Step load causes should be minimized because the change in current of the step load can be orders of magnitude faster than the reaction time of the power supply. A typical power supply reacts to changing current in a matter of milliseconds while a modern microprocessor is capable of switching from its minimum current to its maximum current in nanoseconds. Until the power supply can react to changes in the current, the power distribution network of the system must have enough capacitance to supply or sink the extra current. If the capacitance of the power distribution network is insufficient, the voltage of the system will droop or surge. Additionally, the power distribution network typically possesses significant inductance properties. While the current is constant, this inductance poses no concern. A sudden change in step load current over time, dI/dt, however, can create large noise events that result in voltage spikes and/or ringing of the system power supply.

As electronic systems and devices have become more complex, step load has correspondingly increased. Increased operating frequencies have also caused the time constant of step loads to decrease. Together, these factors have made the step load phenomenon increasingly important and this trend is likely to continue. In fact, if a current state-of-the-art microprocessor is not designed with step load in mind, the occurrence of step load may become more than a cost issue and may actually make the system containing the microprocessor incapable of being manufactured.

Power-Down Circuitry Techniques

The most common technique used to improve power characteristics of a processor is to power-down unused circuitry or functional areas of the processor. Consider a typical microprocessor capable of executing one of three types of instructions, integer, floating-point, or memory, per cycle. An amount of power is associated with each type of instruction as well with overhead. As an example, assume the following power dissipation of integer, floating-point, and memory functional units as well as with overhead of the processor illustrated in Table 1:

TABLE 1

| overhead | 5 W |
| integer | 5 W |
| floating-point | 10 W |
| memory | 5 W |

If an unused functional unit of the processor is not powered-down, the maximum power dissipation of the processor will be the sum of the power dissipation of each functional unit type plus overhead, or 25 W. Since, in this example, the overhead, integer, floating-point and memory functional units of the processor are always on, the minimum power will also be 25 W. The difference between the maximum power and the minimum power of the processor, or step load, is thus zero. Finally, average power will also be 25 W. The maximum power, minimum power, average power and step load of such a processor that does not employ power-down circuitry are illustrated in Table 2.

TABLE 2

Processor without power-down circuitry:

max power = overhead + integer + floating point + memory = 25 W
min power = max power = 25 W
25 W ≦ average power ≦ 25 W
step load = max power − min power = 0 W If, however, the type of instruction currently being executed is detected such that unused functional unit or circuitry not currently executing instructions may be powered-down, then the maximum power can be reduced. According to the power dissipation values of this example, the maximum power consumption of the processor, then, occurs when the floating point functional unit of the processor is executing a floating point instruction and thus the integer and memory portions of the processor are inactive. The maximum power consumption in this instance is 15 W and is determined only by the floating-point circuitry, which consumes 10 W, and the overhead circuitry of the processor, which consumes 5 W. The minimum power consumption of 5 W occurs when the processor is idle and only overhead power is consumed. In this example, the difference between the maximum power consumption and the minimum power consumption, or step load, is 10 W. Average power will be between 5 W and 15 W depending on the instruction mix (integer, floating-point and memory) of the processor. Table 3 illustrates the maximum power, minimum power, average power and step load of a processor that does use power-down circuitry.

TABLE 3

Processor with power-down circuitry:

max power = overhead + Max (integer, floating point, or memory) = 25 W
min power = overhead = 5 W
5 W ≦ average power ≦ 15 W
step load = max power − min power = 10 W Table 3 illustrates that the use of power-down circuitry successfully reduces maximum and average power at a cost of increasing step load. In the example used, maximum power was reduced from 25 W to 15 W, average power was reduced from 25 W to a range of between 5 W and 15 W, and step load increased from 0 W to 10 W. For some systems, particularly portable computers, power-down circuitry likely provides the best trade-off between step load and power parameters. For non-portable computer systems, however, the increase in step load may significantly increase system cost, making the system effectively incapable of being manufactured. There is therefore an unmet need in the art to be able to reduce the maximum power of an electronic system, sub-system or device without increasing the step load of the electronic system, sub-system or device.

It is therefore an object of the present invention to reduce maximum power of an electronic system, sub-system or device.

It is further an object of the present invention to reduce maximum power of an electronic system, sub-system or device without increasing step load of the electronic system, sub-system or device.

It is still a further object of the present invention to reduce maximum power of an electronic system, sub-system or device while simultaneously reducing the step load of the electronic system, sub-system or device.

It is yet another object of the invention to reduce the step load of an electronic system, sub-system or device beyond that achievable using current power-down circuitry techniques while maintaining a reduction in maximum power achievable with power-down circuitry techniques.

SUMMARY OF THE INVENTION

The present invention discloses a methodology and structure of power balancing capable of simultaneously minimizing maximum power and step load of any electronic system, subsystem, or device, referred to as an electronic system, having one or more functional units or resources that are not in constant use and that are therefore capable of being selectively powered-down or powered-up. The present invention teaches that minimum power of an electronic system can be raised without increasing maximum power to render a reduced step load of the system.

An electronic system has a plurality of functional resources that dissipate power. One or more of these functional resources will not be constantly operational and therefore may be selectively powered-up or powered-down to reduce maximum power and load step of the system. In addition to the functional resources, the electronic system will contain a control unit or other control means that is capable of selectively powering-up or powering-down the functional resources. The control unit has a scheduler that receives instructions that will indicate whether a functional resource of the plurality of functional resources is to be powered-up or powered-down. The scheduler unit will generate one or more launch control signals in response to the incoming instructions. A power manager unit coupled to the control unit will monitor the instructions received by the control unit to determine whether the power dissipation of one or more functional resources need to be balanced. The power manager unit will generate one or more balance control signals in response to the incoming instructions. A logic unit receives the launch and balance control signals and gates them with another control signal, which may be a master clock signal in the case of a processor, to selectively power-up or power-down one or more of the plurality of functional resources of the system.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawings, wherein:

DESCRIPTION OF THE INVENTION

The present invention describes a method and structure of power balancing that is capable of simultaneously minimizing maximum power while also reducing the step load of any electronic system, subsystem, or device having one or more functional units or resources that are not in constant use and that are therefore capable of being selectively powered-down or powered-up. Such an electronic system, subsystem, or device, referred to hereinafter as an electronic system, encompasses a VLSI (Very Large Scale Integration) system such as a computer system having at least one processor. Additionally, power balancing is equally applicable to FP (Floating-Point) co-processors, graphics accelerators, memory chips with banked memory, real-time video filtering compression/decompression, and DSPs (digital signal processors), all of which have multiple functional resources capable of being selectively powered-down or powered-up.

Power balancing is an extension of conventional power-down techniques and has as its primary goal the reduction of step load beyond that achievable using traditional power-down techniques while maintaining a reduction in maximum power comparable to that achieved using traditional power-down techniques. Power balancing raises minimum power without increasing maximum power.

Consider again the example of a processor of a computer system capable of executing one of three types of instructions, integer, floating-point, or memory, per cycle. An amount of power is associated with each type of instruction as well with overhead circuitry; again assume that overhead circuitry dissipates 5 W, integer circuitry dissipates 5 W, floating-point circuitry dissipates 10 W, and memory circuitry dissipates 5 W. In this example, assume that the floating-point circuitry of the processor is currently not being used. Rather than powering-down the entire floating-point circuitry, a portion of the unused circuitry, such as half of the floating-point circuitry, may be powered-down. The floating-point circuitry of the processor will still dissipate 5 W even when the processor is idle. The 5 W from the still powered-up half portion of the floating-point circuitry is now effectively part of overhead since the processor overhead is defined as circuitry that is always operational. The relative power dissipations for the circuitries of the processor in this example are illustrated in Table 4 below.

TABLE 4

| overhead | 10 W |
|---|---|
| integer | 5 W |
| floating-point | 5 W |
| memory | 5 W |

Because power dissipation has shifted from the floating-point circuitry to overhead, minimum power has increased from 5 W to 10 W. Maximum power, however, remains unchanged at 15 W because while overhead has increased to 10 W, the maximum power dissipated by integer circuitry, floating-point circuitry, and memory circuitry has decreased to 5 W. The net effect of power balancing is to decrease the step load by half, from 10 W to 5 W. Increasing minimum power will of course increase average power dissipation of the system, but this is more of a concern for portable computers rather than for non-portable computers. Table 5 illustrates the effects of power balancing in this example:

TABLE 5

Processor with power balancing:

max power = overhead + Max (integer, floating point, or memory) = 15 W
min power = overhead = 10 W
10 W $\leq$ average power $\leq$ 15 W
step load = max power − min power = 5 W By shifting a portion of the power dissipation of the floating-point circuitry into overhead, the three sources of variable power of the processor, floating-point circuitry, integer circuitry, and memory circuitry, have been equalized to maximize minimum power without increasing maximum power. Equalization of the power dissipation of variable sources is an aspect of power balancing.

Another aspect of power balancing further reduces the step load of a system. In the above example, assume that the integer circuitry of the processor is turned on whenever the floating-point or memory units are idle. While this has no impact on maximum power, it will change the minimum power dissipated, defined as the overhead plus the minimum of power dissipated from the integer circuitry, the floating-point circuitry, or the memory circuitry. Minimum power will be increased so that it is equal to maximum power, thereby rendering a step load of zero as illustrated in Table 6 below.

It should be noted that while the step load may be reduced to zero, benefit will still be realized from any reduction of step load, even if step load is not reduced to zero. Step load may be reduced in accordance with the demands of the system so that further optimization of the step load is not required. Additionally, the power dissipation of any functional unit of the system, such as the integer circuitry, the floating-point circuitry, and the memory circuitry, may vary with the data being computed. This power variation within a single functional unit may limit how much the step load of the system can be reduced by power balancing.

TABLE 6

Processor with power balancing to achieve a step load of zero:

max power = overhead + Max (integer, floating point, or memory) = 15 W
min power = overhead + Min (integer, floating-point, or memory) = 15 W
15 W ≦ average power ≦ 15 W
step load = max power − min power = 0 W In addition to shifting power dissipation into the overhead component of the system, the variable power components of the system (integer circuitry, floating-point circuitry, and memory circuitry) have been balanced against each other to raise the minimum power such that the step load is in turn minimized or zeroed out. This aspect of power balancing is referred to as ideal power balancing.

Power balancing provides for both the maximum power dissipated by a system and the step load of the system to be reduced simultaneously if so desired. Reducing the average power is typically not a major concern of non-portable computer systems.

Figure 1:
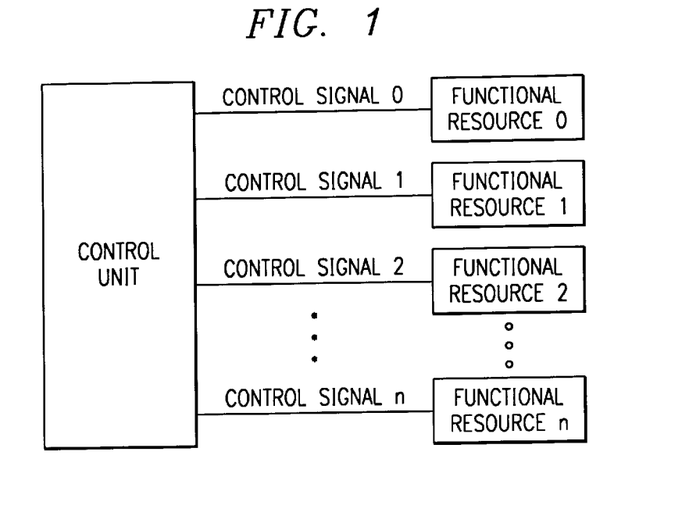
FIG. 1 shows an overall block diagram of power balancing, according to the present invention.

Referring to FIG. 1, an overall block diagram that illustrates power balancing is shown. A control unit generates control signals that selectively power-up or power-down functional resources. The control unit generates a control signal for each functional resource to be thus controlled. Control unit therefore generates control signal0 to selectively power-up or power-down functional resource0, control signal0 to selectively power-up or power-down functional resource1, control signal2 to selectively power-up or power-down functional resource2, and control signaln to selectively power-up or power-down functional resourcen. The overall scheme embodied in FIG. 1 may be used in any electronic system, sub-system, or device is which power balancing is to be employed.

Figure 2:
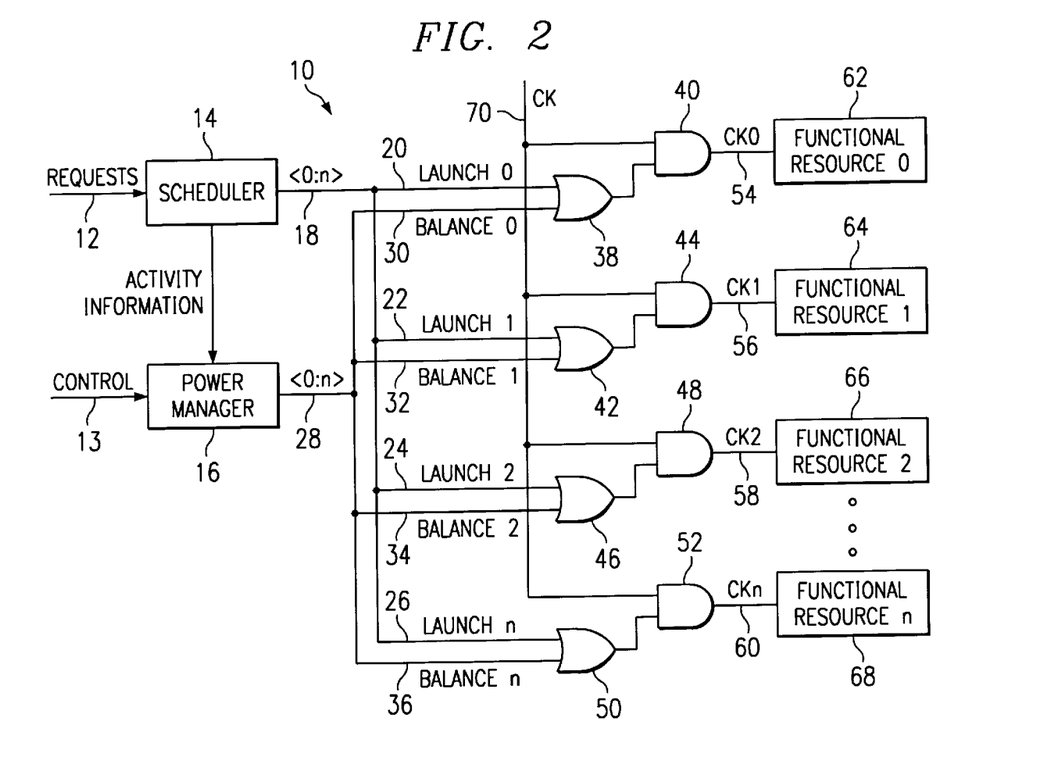
FIG. 2 shows a block diagram illustrating ideal power balancing of an electronic system or device having a master clock signal, according to the present invention.

Referring to FIG. 2, a block diagram 10 illustrating ideal power balancing of an electronic system or device having a master clock signal is shown. The electronic system has a number of functional resources, 0 to n, designated as functional resource0 62, functional resource1 64, functional resource2 66, and functional resourcen 68. Functional resources 62, 64, 66, and 68 are characterized as not being in constant use within the electronic system and thus are capable of being selectively powered-down. In the processor example discussed above, the functional resources would consist of the floating-point functional unit, the integer functional unit and the memory functional unit of a processor. In the case of a system, the functional resource may be sub-systems or devices of the system. Each functional resource 62, 64, 66, 68 dissipates a given amount of power when it is turned on.

Each functional resource 62, 64, 66, 68 is turned on by activation of its local clock signal. Functional resource0 62 is turned on or off by local clock CK0 signal 54. Functional resource1 64 is likewise controlled by local clock CK1 signal 56. Functional resource2 66 is controlled by local clock CK2 signal 58 and functional resource3 68 is turned on or off by local clock CK3 signal 60. The generation of local clock signals 54, 56, 58, and 60 occurs locally by "gating" the Global clock CK signal 70 as will be described.

Scheduler 14 takes incoming instructions, called requests received on incoming bus 12 requesting activity of one or more of the functional resources 62, 64, 66, 68, and distributes the requests to the appropriate functional resource by launch signals, launch0 . . . launchn, over outgoing bus 18. To power-up or power-down a particular functional resource, scheduler 14 drives the appropriate launch signal of launch0 signal 20, launch1 signal 22, launch2 signal 24, and launchn signal 26 that is required to activate or de-activate the appropriate local clock. The launch signal is an input to its associated logic OR gate of logic OR gates 38, 42, 46, 50.

In addition to a launch signal, each logic OR gate will also receive its associated balance signal of balance0 signal 30, balance1 signal 32, balance2 signal 34, and balance3 signal 36. Power manager 16 monitors the incoming requests to scheduler 14 via signal 15 and generates balancing request signals balance0 signal 30, balance1 signal 32, balance2 signal 34 and balancen signal 36 over bus 28. The balancing request signals operate to selectively keep minimum power dissipation close to maximum power dissipation in order to selectively configure the step load of the system. Power manager 16 may be pre-programmed to generate balance signals 30, 32, 34, 36 in response to given conditions or power manager 16 may optionally be controlled through control signal 13.

The launch signal and balance signal associated with a functional resource are input signals to a logic OR gate where they are OR'ed together to generate an output signal. The output signal of the logic OR gate and global clock CK signal 70 are input signals to a second logic AND gate along that generates a local clock signal that controls whether the functional resource is on or off. For instance, in order to power-up or power-down functional resource0 62, a request over incoming bus 12 is received by scheduler 14 indicating that functional resource0 62 is to be powered-up or powered-down. Scheduler 14 drives launch0 signal 20 over bus 18 as an input to logic OR gate 38 as shown. Other functional resources 62, 64, 66, 68 may be similarly powered-up or powered-down in the same manner.

It must be noted that while FIG. 2 illustrates power balancing of an electronic system, sub-system, or device having a master clock, FIG. 1 makes it clear that power balancing may be implemented on electronic systems, sub-systems or devices that employ control signals other than clock signals. Additionally, the logic functions represented by logic gates 38, 40, 42, 44, 46, 48, 50, and 52 may be implemented with other equivalent combinations of logic functions and gates known in the art without departing from the spirit and scope of the invention.

Figure 3:
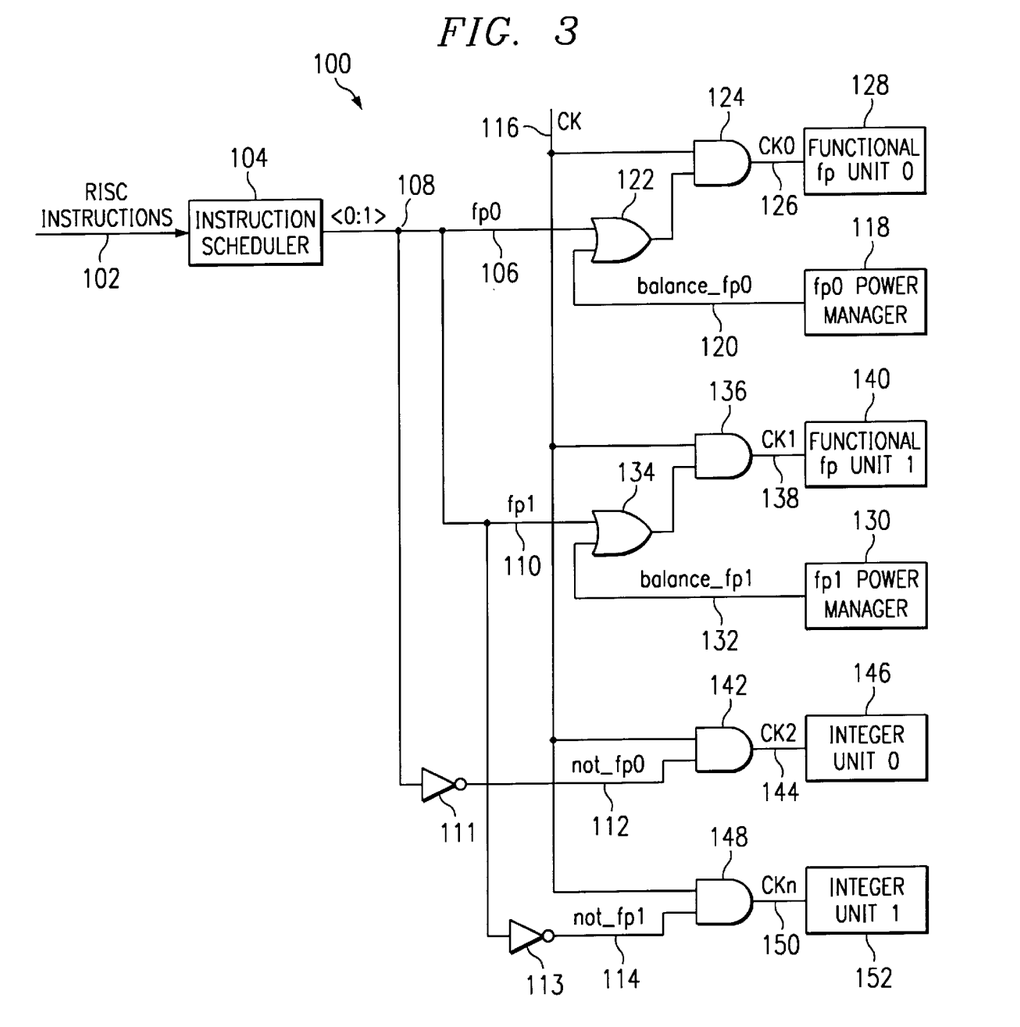
FIG. 3 illustrates an example of power balancing implemented on a processor having floating-point and integer functional capabilities, according to the present invention.

Referring now to FIG. 3, an example of how power balancing might be implemented on a processor having floating-point and integer functional capabilities is illustrated. Block diagram 100 of FIG. 3 shows two types of functional resources: fp (floating-point) units 128, 140 and integer units 146, 152. The processor also has memory units that are not illustrated here because power balancing is not implemented on them in this example. The circuitry of block diagram 100 provides for these functional resources to be selectively powered-up or powered-down to achieve the desired maximum power and step load of the processor.

Instruction scheduler 104 receives RISC (Reduced Instruction Set Chip) instructions that indicate which functional resource units are to be powered-up or powered-down and when. The RISC instructions received on bus 102 by the instruction scheduler 104 are distributed by instruction scheduler 104 to the appropriate functional resource unit: fp unit0 128, fp unit1 140, integer unit0 146, or integer unit1 152. Launch signals fp0 108 and fp1 110 of fp unit0 128 and fp unit1 140, respectively, are output on bus 106 from instruction scheduler 104 as separate signals. The launch signals of integer unit0 146 and integer unit1 152 are not fp0 signal 112 and not fp1 signal 114, respectively. As shown in FIG. 3, inverter 111 inverts fp0 signal 108 to yield not fp0 signal 112; inverter 113 inverts fp1 signal 110 to yield not fp1 signal 114.

The power manager function shown in FIG. 2 is implemented as decentralized, distributed power management circuitry. In FIG. 3, there is local power management circuitry associated with the floating-point units 128 and 140; fp0 power manager 118 is associated with fp unit0 128 and fp1 power manager 130 is associated with fp unit1 140. Power management circuitry is associated with the floating-point resource units and not with the integer resource units because the floating-point circuitry of a processor dissipates significantly more power than does integer circuitry and therefore a local power management block is associated with each floating-point unit. Each local power management block monitors the activity of its functional resource unit and generates balancing requests as necessary to maintain a minimum level of power dissipation, thereby increasing the minimum power dissipated without increasing the maximum power dissipated and thus minimizing the step load of the processor. The minimum level of power dissipation results from at least a portion of the floating-point unit always being on and operational. Since this power dissipation is maintained at all times, it is not capable of being powered-down and is therefore rightfully considered part of the power dissipated by overhead circuitry of the processor. Thus, the local power management block operates to move a portion of the floating-point unit power dissipation into overhead unit dissipation.

The above concepts may be illustrated by the following example. Launch fp0 signal 108 and balance fp0 signal 120 generated by fp0 power manager 118 are input signals to OR logic gate 122. The output signal of OR logic gate 122 and global clock CK signal 116 are in turn input signals to AND logic gate 124 which generates local clock CK0 signal 126. Local clock CK0 signal 126 controls fp unit0 128 to partially or fully power-up or power-down. Suppose, for example, that fp unit0 128 has a maximum power dissipation of 15 W. fp0 power manager 118 can generate balance fp0 signal 120 that will ensure that fp unit0 128 will always dissipate at least 10 W, even when fp unit0 128 is not functionally operational. Increasing the minimum power dissipated by fp unit0 128 from 0 to 10 W has the desired effect of decreasing the step load of the fp unit from 15 W to 5 W.

To further reduce the step load of the processor, the RISC instructions is received over bus 102 by instruction scheduler may guarantee that the integer units integer unit0 146 and integer unit1 152 will be active (powered-up) and dissipating power when the floating point units are idle. Specifically, the step point remaining in fp unit0 128 may be balanced by the step load of integer unit0 146. Likewise, the step load of fp unit1 140 may be balanced against that of integer unit1 152 in order to reduce the overall step load of the processor towards zero.

It will be understood by those of ordinary skill in the art that the logic functions represented by logic gates 122, 124, 134, 136, 142, and 148 of FIG. 3 may be implemented with other equivalent combinations of logic functions and gates known in the art without departing from the spirit and scope of the invention.

Figure 4:
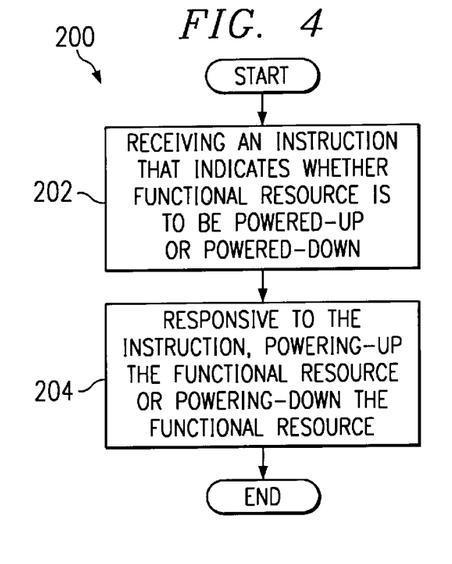
FIG. 4 illustrates the overall method flow of the power balancing, according to the present invention.

Referring to FIG. 4, the overall method flow 200 of power balancing, according to the present invention, is shown. This method was previously described in conjunction with FIGS. 2 and 3 above. In Block 202, the control unit comprised of scheduler 14 and power manager 16 receives an instruction that indicates whether a functional resource, such as functional resources 62, 64, 66, 68, is to be powered-up or powered-down. Next, in Block 204, in response to the instruction the control unit powers-up or powers-down the functional resource.

Figure 5:
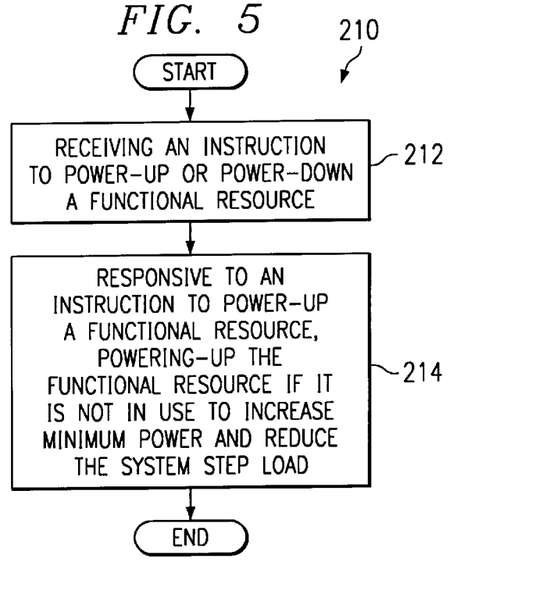
FIG. 5 illustrates a flowchart for reducing the step load by increasing the minimum power dissipated, according to the present invention.

Selective powering-up and powering-down of functional resources allows power dissipation to be decreased and step load to be decreased. A primary method of the present invention in reducing the step load is to increase the minimum power dissipated, as previously discussed. Referring now to FIG. 5, a flowchart 210 that illustrates this approach is shown. First, in Block 212, an instruction is received by the control unit to power-up or power-down a functional resource. Then, as shown in Block 214, when the control unit has ascertained that the functional resource is not in use, the functional resource is powered-up to increase the minimum power dissipated by the system and thus to reduce the system step load.

Figure 6:
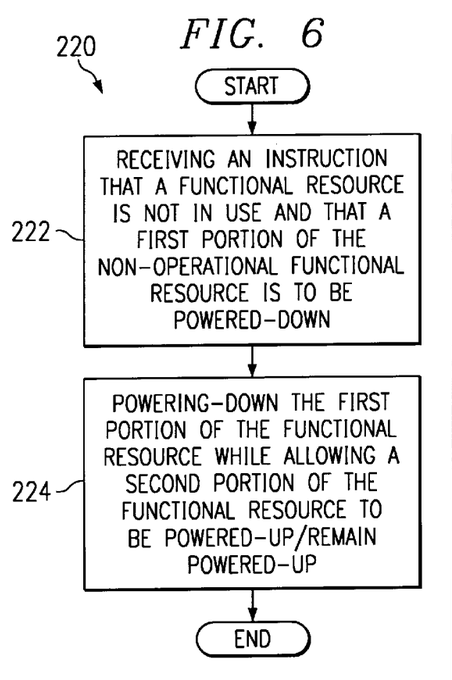
FIG. 6 further illustrates that only a portion of a functional resource need be powered-down, thereby leaving a portion powered-up that operates to raise the minimum system power dissipation, according to the present invention.

FIG. 6 further illustrates the concept described above that only a portion of a functional resource need be powered-down, thereby leaving a portion powered-up that operates to raise the minimum system power dissipation. As shown in the flowchart 220 of FIG. 6, at Block 222 the control unit would receive an instruction that a functional resource is not in use, i.e. not operational, and that only a first portion of the unused functional resource is to be powered-down. Then, at Block 224, the control unit would operate to power-down the first portion of the functional resource while allowing a second portion of the functional resource to remain powered-up or to be powered-up. As explained above, powering-down the first portion while powering-up the second portion has the effect of decreasing the increase in power dissipated by the functional resource when operational, increasing the minimum power dissipated by the system as measured by the power dissipated by the second powered-up portion of the functional resource, decreasing the maximum power dissipated by the amount of power dissipated by the first portion that is powered-down, and reducing the step load of the system.

Figure 7:
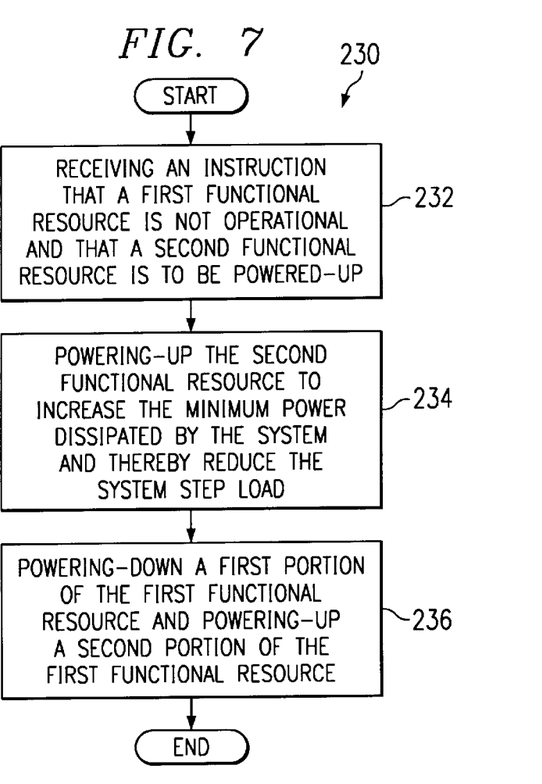
FIG. 7 illustrates application of the present invention to a system having two or more functional resources, according to the present invention.

The flowchart 230 of FIG. 7 illustrates that the invention applies where more than one functional resource, as shown in FIGS. 1–3, is involved. In Block 232, the control unit receives an instruction that a first functional resource is not operational and that a second functional resource is to be powered-up. Then, in Block 234, the control unit in response to the instruction operates to power-up the second functional resource. This has the effect of increasing the minimum power dissipation of the system and thereby decreasing the step load of the system. Additionally, a first portion of the non-operational first functional resource may be powered-down in addition to the second functional resource being powered-up. This means that a second portion of the non-operational first functional resource remains powered-up or is powered-up. This has the benefit of further reducing the step load of the system, defined as the difference between the minimum and maximum power dissipated.

While the invention has been particularly shown and described with reference to a preferred embodiment, it will be understood by those skilled in the art that various changes in form and detail may be made therein without departing from the spirit and scope of the invention.

What is claimed is:

1. An electronic system having power balancing, comprising:
   a non-pipelined functional resource of the electronic system that is not in constant use and therefore may be selectively powered-up or powered-down; and
   a control means of the electronic system capable of selectively powering-up or powering-down the non-pipelined functional resource,
   wherein when the non-pipelined functional resource is not in use, the control means powers-up the unused non-pipelined functional resource to increase the minimum power dissipated by the system and thereby reduce the step load of the system defined as the difference between the maximum power dissipated by the system less the minimum power dissipated by the system.

2. The electronic system of claim 1, wherein the control means comprises:
   a scheduler that receives instructions on whether the non-pipelined functional resource is to be powered-up or powered-down and that generates a first control signal; and
   a logic unit that gates the first control signal with a second control signal to selectively power-up or power-down the non-pipelined functional resource according to the instructions received by the scheduler.

3. The electronic system of claim 1, wherein the electronic system is a processor.

4. An electronic system having power balancing, comprising:
   a first functional resource of the electronic system that dissipates power when operational;
   a second functional resource of the electronic system that dissipates power when operational, wherein the second functional resource is not pipelined to the first functional resource; and
   a control means capable of selectively powering-up or powering-down the first functional resource and the second functional resource,
   wherein when the first functional resource is not operational, the control means selectively powers-down a first portion of the first functional resource thereby decreasing an increase in power dissipated by the first functional resource when operational, increasing the minimum power dissipated by the system by the power dissipated by a second portion of the first functional resource that is not powered-down, decreasing the maximum power dissipated by the system by the power dissipated by the first portion of the first functional resource that is powered-down, and reducing the step load of the system defined as the difference between the maximum power dissipated by the system less the minimum power dissipated by the system.

5. The electronic system of claim 4, wherein the minimum power dissipated by the system is generated by overhead of the system.

6. The electronic system of claim 5, wherein the second portion of the first functional resource powered-up when the first functional resource is not operational increases the power dissipated by overhead of the system.

7. The electronic system of claim 4, wherein when the control means selectively powers-down the first portion of the first functional resource thereby decreasing the increase in power dissipated by the first functional resource when operational, the power dissipated by the first functional resource when operational is equal to the power dissipated by the second functional resource when operational.

8. The electronic system of claim 4, wherein the electronic system is a processor.

9. The electronic system of claim 8, wherein the first functional resource is a floating-point unit of the processor and the second functional resource is an integer unit of the processor.

10. The electronic system of claim 4, wherein the control means comprises:
    a scheduler that receives instructions on whether the first functional resource is to be powered-up or powered-down, on whether the second functional resource is to be powered-up or powered-down, and that generates a first control signal and a second control signal; and
    a logic unit that gates the first control signal with a third control signal to selectively power-up or power-down the first functional resource and that gates the second control signal with the third control signal to selectively power-up or power-down the second functional resource.

11. An electronic system having power balancing, comprising:
    a first functional resource of the electronic system that dissipates power when operational;
    a second functional resource of the electronic system that dissipates power when operational; and
    a control means of the electronic system capable of selectively powering-up or powering-down the first functional resource and the second functional resource,
    wherein when the first functional resource is not operational, the control means selectively powers-up the second functional resource thereby increasing the minimum power dissipated by the system by the power dissipated by the second functional resource when operational and reducing the step load of the system defined as the difference between the maximum power dissipated by the system less the minimum power dissipated by the system.

12. The electronic system of claim 11, wherein the electronic system is a processor.

13. The electronic system of claim 12, wherein the first functional resource is a floating-point unit of the processor and the second functional resource is an integer unit of the processor.

14. The electronic system of claim 11, wherein the control means comprises:
    a scheduler that receives instructions on whether the first functional resource is to be powered-up or powered-down, on whether the second functional resource is to be powered-up or powered-down, and that generates a first control signal and a second control signal;
    a power manager coupled to the scheduler that monitors instructions on whether the first functional resource is to be powered-up or powered-down, on whether the second functional resource is to be powered-up or powered-down, and that generates a third control signal and a fourth control signal; and a logic unit that gates the first control signal with the third control signal and a fifth control signal to selectively power-up or power-down the first functional resource and that gates the second control signal with the fourth control signal and the fifth control signal to selectively power-up or power-down the second functional resource.

15. An electronic system having power balancing, comprising:

a first functional resource of the electronic system that dissipates power when operational;

a second functional resource of the electronic system that dissipates power when operational; and a control means of the electronic system capable of selectively powering-up or powering-down the first functional resource and the second functional resource, wherein when the first functional resource is not operational, the control means selectively powers-down a first portion of the first functional resource and powers-up the second functional resource thereby decreasing an increase in power dissipated by the first functional resource when operational, increasing the minimum power dissipated by the system by the power dissipated by a second portion of the first functional resource that is not powered-down and by the power dissipated by the second functional resource when operational, decreasing the maximum power dissipated by the system by the power dissipated by the first portion of the first functional resource that is powered-down, and reducing the step load of the system defined as the difference between the maximum power dissipated by the system less the minimum power dissipated by the system.

16. The electronic system of claim 15, wherein the electronic system is a processor.

17. The electronic system of claim 16, wherein the first functional unit of the processor is a floating-point unit and the second functional unit of the processor is an integer unit.

18. The electronic system of claim 15, wherein the control means comprises:

a scheduler that receives instructions on whether the first functional resource is to be powered-up or powered-down, on whether the second functional resource is to be powered-up or powered-down, and that generates a first control signal and a second control signal;

a power manager coupled to the scheduler that monitors instructions on whether the first functional resource is to be powered-up or powered-down, on whether the second functional resource is to be powered-up or powered-down, and that generates a third control signal and a fourth control signal; and a logic unit that gates the first control signal with the third control signal and a fifth control signal to selectively power-up or power-down the first functional resource and that gates the second control signal with the fourth control signal and the fifth control signal to selectively power-up or power-down the second functional resource.

19. A method of power balancing, comprising the steps of:

receiving an instruction that indicates that a functional resource of the electronic system is not operational and that a first portion of the functional resource that is not operational is to be powered-down; and responsive to the instruction, selectively powering-down the first portion of the functional resource of the electronic system, thereby decreasing an increase in power dissipated by the functional resource when operational, increasing the minimum power dissipated by the system by the power dissipated by a second portion of the functional resource that is not powered-down, decreasing the maximum power dissipated by the system by the power dissipated by the first portion of the functional resource that is powered-down, and reducing the step load of the system defined as the difference between the maximum power dissipated by the system less the minimum power dissipated by the system, wherein the step of selectively powering-down the portion of the functional resource decreases the increase in power dissipated by the functional resource when operational and the power dissipated by the functional resource when operational is equal to the power dissipated by a second functional resource of the electronic system when operational, wherein the second functional resource is not pipelined to the first functional resource.

20. A method of power balancing, comprising the steps of:

receiving an instruction that indicates that a first functional resource of an electronic system is not operational and that a second functional resource is to be powered-up;

responsive to the instruction, selectively powering-up the second functional resource of the electronic system, thereby increasing the minimum power dissipated by the system by the power dissipated by the second functional resource when operational and reducing the step load of the system defined as the difference between the maximum power dissipated by the system less the minimum power dissipated by the system.

21. A method of power balancing, comprising the steps of:

receiving an instruction that indicates that a first functional resource of an electronic system is not operational and that a first portion of the first functional resource is to be powered-down and a second functional resource is to be powered-up;

responsive to the instruction, selectively powering-down the first portion of the first functional resource and powering-up the second functional resource of the electronic system, thereby decreasing an increase in power dissipated by the first functional resource when operational, increasing the minimum power dissipated by the system by the power dissipated by a second portion of the first functional resource that is not powered-down and by the power dissipated by the second functional resource when operational, decreasing the maximum power dissipated by the system by the power dissipated by the first portion of the first functional resource that is powered-down, and reducing the step load of the system defined as the difference between the maximum power dissipated by the system less the minimum power dissipated by the system.

* * * * *